United States Patent Office 3,546,105
Patented Dec. 8, 1970

3,546,105
HYDRODESULFURIZATION PROCESS
Joseph Jaffe, Berkeley, Calif., assignor to Chevron Research Company, San Francisco, Calif., a corporation of Delaware
No Drawing. Continuation-in-part of application Ser. No. 671,994, Oct. 2, 1967. This application Aug. 8, 1969, Ser. No. 848,723
Int. Cl. C10g 23/02
U.S. Cl. 208—216
2 Claims

ABSTRACT OF THE DISCLOSURE

Hydrodesulfurization process using a catalyst consisting essentially of alumina, a component selected from titanium and zirconium and compounds thereof, a component selected from phosphorus and compounds thereof, a component selected from nickel and cobalt and compounds thereof, and a component selected from molybdenum and tungsten and compounds thereof.

RELATED APPLICATION

This application is a continuation-in-part of Joseph Jaffe application Ser. No. 671,994, filed Oct. 2, 1967, which issued as U.S. Pat. 3,493,517 on Feb. 3, 1970.

INTRODUCTION

This application relates to catalytic hydrodesulfurization processes.

PRIOR ART HYDRODESULFURIZATION PROCESSES AND PROBLEMS

Catalytic hydrodesulfurization in general is well known. Representative of prior art catalysts used for hydrodesulfurization are those alumina-containing catalysts consisting of the following combinations of components, with the various hydrogenating components being in the forms of metals or metal compounds: $NiMoAl_2O_3$, $NiMoAl_2O_3F$
$CoMoAl_2O_3$, $CoMoAl_2O_3F$.
In various modifications of such prior art catalysts, silica as well as alumina may be present.

The above-described catalysts are known to be effective for catalytic hydrodenitrification and catalytic hydrodesulfurization of hydrocarbon feedstocks, particularly hydrocarbon feedstocks such as vacuum gas oils that do not contain appreciable amounts of heavy residual materials. Hydrofining of the heavier residual feedstocks generally is more concerned with hydrodesulfurization than with hydrodenitrification, because such feedstocks frequently are intended for use as heavy fuels which must have a low sulfur content to conform with air pollution requirements, but which may have an appreciable nitrogen content. To the contrary, lighter feedstocks not containing appreciable amounts of heavy residual materials generally are intended to be supplied to subsequent processing units, such as catalytic hydrocracking units, which contain nitrogen-sensitive but sulfur-tolerant catalysts. Accordingly, hydrodenitrification of such lighter feedstocks frequently is of greater concern than hydrodesulfurization, although generally hydrodesulfurization is accomplished inherently during the necessary hydrodenitrification.

It is known that hydrodesulfurization of feedstocks containing appreciable amounts of heavy residual materials presents problems of a much more severe nature than does hydrofining of lighter feedstocks. Catalysts that are adequate for hydrofining the lighter feedstocks may be entirely inadequate for hydrodesulfurization of heavier stocks. There has been a continuing search for improved hydrodesulfurization processes using catalysts having improved activities and stabilities in hydrodesulfurization service. A very effective catalyst for this purpose, that recently has been discovered, is described in the copending application of Joseph Jaffe, Ser. No 743,003, filed July 8, 1968. In one embodiment, the catalyst described in said Jaffe application consists of nickel oxide, molybdenum oxide, titanium phosphate, fluorine and alumina. However, fluorine-containing catalysts are often considered to have certain potential disadvantages, based on the possibility of some fluorine loss from the catalyst during process operation and further based on the possible corrosivity of resulting fluorine-containing compounds. Despite recent advantages in hydrodesulfurization processes, there is a continuing need for further improvements, particularly because feedstocks containing appreciable amounts of heavier materials, that must be desulfurized, also contain appreciable amounts of metals, including nickel and vanadium. These metals are particularly detrimental to hydrodesulfurization processes, because during the hydrodesulfurization reaction they are caused to deposit on the surface of the catalyst particles, where they form a coating, which eventually blocks off access of the hydrocarbon reactant molecules to the catalytically active sites within the catalyst particles.

OBJECTS OF PRESENT INVENTION

In view of the foregoing, it is an object of the present invention to provide an improved catalytic hydrodesulfurization process using a catalyst of high activity and stability that does not contain fluorine.

STATEMENT OF INVENTION

In accordance with the present invention there is provided a hydrodesulfurization process which comprises contacting a hydrocarbon feedstock containing organic sulfur compounds with hydrogen and a catalyst consisting essentially of alumina, a component selected from titanium and zirconium and compounds thereof, a component selected from phosphorus and compounds thereof, a component selected from nickel and cobalt and compounds thereof, and a component selected from molybdenum and tungsten and compounds thereof, in a reaction zone under catalytic hydrodesulfurization conditions, and removing hydrogen sulfide from the effluent from said reaction zone.

Further, in accordance with the present invention, said process preferably is conducted at catalytic hydrodesulfurization conditions selected from values lying within the ranges of conditions set forth below under "Process Conditions."

Preferably, said component selected from titanium and zirconium and compounds thereof and said component selected from phosphorus and compounds thereof are united into a single metal phosphate component selected from titanium phosphate and zirconium phosphate.

Advantageously, said metal phosphate component is in particulate form and is dispersed in a matrix of the remaining catalyst components.

The catalyst required in the process of the present invention preferably is prepared by cogelation rather than impregnation. It may be prepared by the procedures set forth in said Jaffe U.S. Pat. 3,493,517 and application S.N. 743,003, without incorporation of fluorine as permitted by the disclosures of those applications.

PROCESS CONDITIONS

The hydrodesulfurization processes of the present invention may be carried out at conventional hydrodesulfurization process conditions, for example at temperatures in the range 500° to 850° F., pressures in the range 200 to 10,000 p.s.i.g., liquid hourly space velocities, based on the hydrocarbon oil feed, in the range 0.2 to 10, and at total hydrogen rates of 500 to 20,000 s.c.f. of hydrogen per barrel of hydrogen oil feed. The hydrodesulfurization process of the present invention conducted under these conditions will effect the removal of a substantial proportion of the sulfur compounds contained in a wide variety of hydrocarbon feedstocks, for example hydrocarbon distillates such as cracked naphthas, light cycle oils, coker distillates, straight-run gas oils, and residual hydrocarbon feedstocks.

EXAMPLE

The following example will serve to further illustrate the process of the present invention.

Three separate portions of an Arabian Atmospheric Residuum hydrocarbon feedstock were separately hydrodesulfurized in the presence of three different fluorine-free catalysts, including the catalyst used in the process of the present invention, at identical conditions. The hydrocarbon feedstock had the following characteristics:

| | |
|---|---|
| Gravity, °API | 17.5 |
| Sulfur content, weight percent | 2.9 |
| Nitrogen content, p.p.m. | 1,310 |
| Asphaltene content, weight percent | 3.7 |
| Nickel content, p.p.m. | 8 |
| Vanadium content, p.p.m. | 30 |
| Iron content, p.p.m. | 5 |
| Sodium content, p.p.m. | 5 |

The hydrodesulfurization conditions were:

| | |
|---|---|
| Space velocity, v./v./hour | 1.2 |
| Total pressure, p.s.i.g. | 1,400 |
| Total hydrogen rate, s.c.f./bbl. | 10,000 |
| Product sulfur, weight percent | 0.5 |
| Starting temperature needed to maintain indicated product sulfur level | (See below) |

The catalysts used were:

| | Catalyst No. | | |
|---|---|---|---|
| | 1 | 2 | 3 |
| BET surface area, M.²/g | 224 | 315 | 321 |
| Average pore diameter, A | 57 | 48 | 55 |
| Porosity, volume percent | 53 | 63 | 65 |
| Components and amounts thereof as weight percentages of catalyst: | | | |
| Ni | 8 | 8 | 8 |
| Mo | 24 | 25 | 20 |
| TiO₂ | | | 10 |
| Al₂O₃ | 38.8 | 52.3 | 44.5 |
| SiO₂ | 15 | | |
| P₂O₅ | | | 5 |
| F | | | |

Catalysts 1 and 2 were comparison catalysts and Catalyst 3 was a catalyst required in the process of the present invention. All catalysts were prepared by cogelation rather than impregnation procedures, to maximize homogeneity of the finished catalysts.

The hydrodesulfurization results were as follows:

| | Catalyst No. | | |
|---|---|---|---|
| | 1 | 2 | 3 |
| Starting temperature, ° F | 748 | 732 | 727 |
| Catalyst fouling rate, ° F./hr | 0.14 | 0.058 | 0.06 |

The foregoing results indicate that in hydrodesulfurizing heavy hydrocarbon feedstocks, particularly residual feedstocks, substantially improved results are obtained if the catalyst is substantially silica-free, compared with results obtained with a catalyst containing more than a few weight percent silica. This is surprising in view of prior knowledge that the presence of silica can be beneficial when hydrofining lighter feedstocks, particularly light distillates.

The foregoing results also indicate that, when a substantially silica-free catalyst is used, the presence therein of a tetravalent metal and phosphorus contributes to superior hydrodesulfurization activity and catalyst stability.

From the foregoing, it may be seen that the process of the present invention is an efficient and effective catalytic hydrodesulfurization process, utilizing a catalyst of high hydrodesulfurization activity and stability, which contains substantially no silica or potentially deleterious fluorine.

What is claimed is:

1. A catalytic hydrodesulfurization process which comprises contacting a hydrocarbon feedstock containing organic sulfur compounds with hydrogen and a catalyst consisting essentially of a component in particulate form selected from titanium phosphate and zirconium phosphate and a continuous phase matrix comprising alumina, a component selected from nickel, cobalt and oxides and sulfides of nickel and cobalt, and a component selected from molybdenum, tungsten and oxides and sulfides of molybdenum and tungsten, said component selected from titanium phosphate and zirconium phosphate being dispersed in said matrix, said contacting being accomplished in a reaction zone under catalytic hydrodesulfurization conditions, and removing hydrogen sulfide from the effluent from said reaction zone.

2. A process as in claim 1, conducted at a temperature in the range 500° to 850° F., a pressure in the range 200 to 10,000 p.s.i.g., a liquid hourly space velocity, based on the hydrocarbon oil feedstock, of 0.2 to 10, and a total hydrogen rate of 500 to 20,000 s.c.f. of hydrogen per barrel of hydrocarbon oil feed.

References Cited

UNITED STATES PATENTS

| | | | |
|---|---|---|---|
| 2,727,010 | 12/1955 | Zimmerschied | 252—437 |
| 3,130,147 | 4/1964 | Dwyer et al. | 252—437 |
| 3,262,874 | 7/1966 | Gatsis | 208—216 |

DELBERT E. GANTZ, Primary Examiner

G. J. CRASANAKIS, Assistant Examiner

U.S. Cl. X.R.

252—437